June 6, 1967 R. E. BISHOP ET AL 3,323,408
OPTICAL ALIGNMENT SYSTEM
Filed Sept. 4, 1962 2 Sheets-Sheet 2

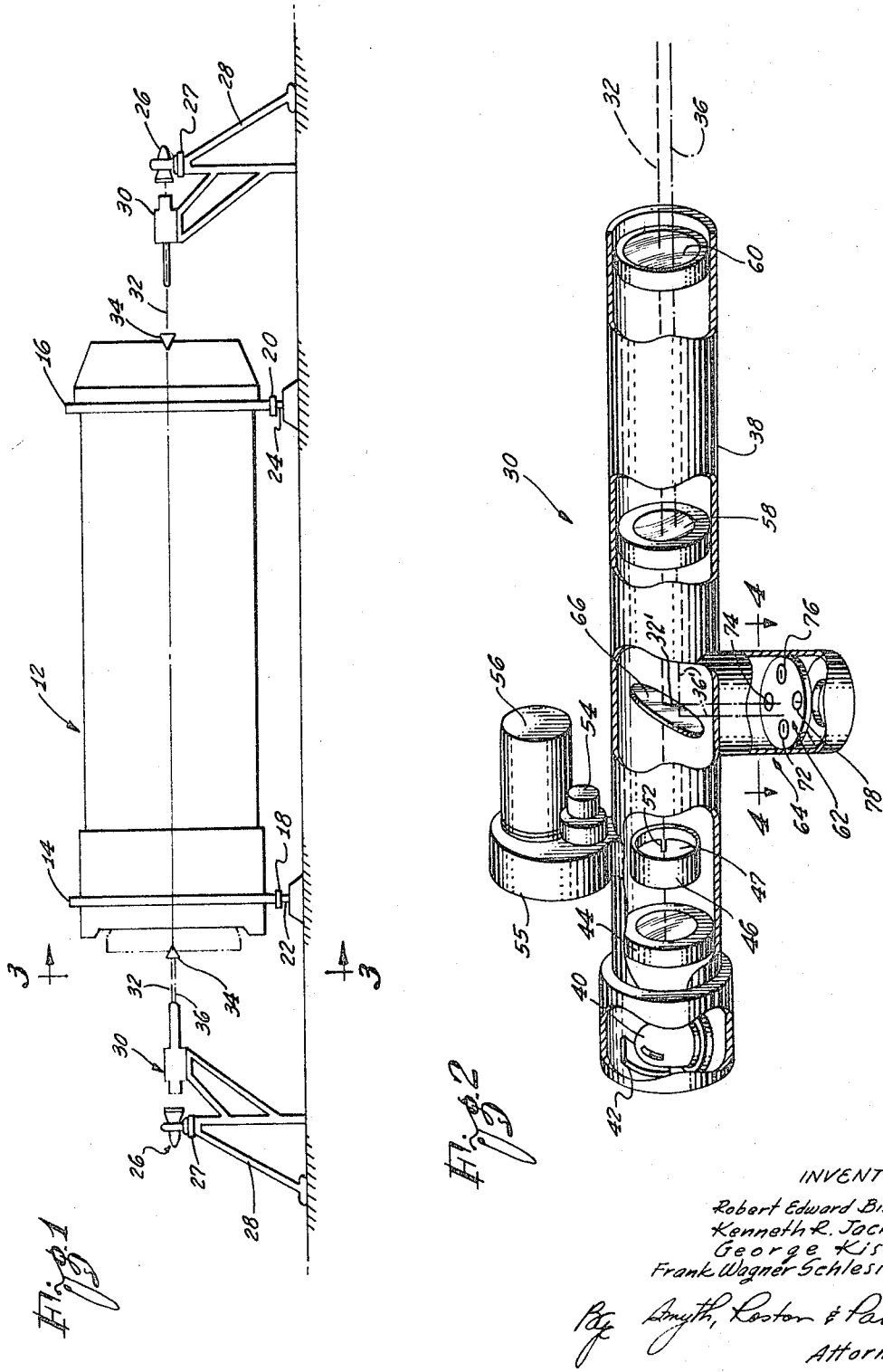

INVENTORS:
Robert Edward Bishop
Kenneth R. Jackson
George Kis
Frank Wagner Schlesinger Attorneys United States Patent Office 3,323,408
Patented June 6, 1967

3,323,408
OPTICAL ALIGNMENT SYSTEM
Robert Edward Bishop, Thousand Oaks, Kenneth R. Jackson, Los Angeles, George Kis, Santa Monica, and Frank Wagner Schlesinger, Sherman Oaks, Calif., assignors, by mesne assignments, to the United States of America as represented by the Administrator of the National Aeronautics and Space Administration
Filed Sept. 4, 1962, Ser. No. 221,276
4 Claims. (Cl. 88—14)

The present invention relates to measuring means and more particularly to means for accurately maintaining a member in a predetermined position.

At the present time it is very frequently desirable to be able to accurately locate a member in some predetermined fixed position and to continuously maintain the member disposed precisely in the position. For example, when assembling large structures such as bridges, buildings, pipelines, etc., it is necessary to maintain the member in position. Also while fabricating large size assemblies in a factory or similar location, it is necessary to maintain the workpiece precisely located while the assembling operations are performed thereon. In particular, the assembly of large space vehicles with their many complex subassemblies requires very precise orientation and alignment of the vehicle during assembly. Heretofore in order to accomplish this objective it has been customary for an operator to employ a transit or theodolite for periodically observing the position of the workpiece. In the event the workpiece has moved from the desired location it is necessary to reposition it. Although such means are capable of positioning the workpiece within acceptable tolerances, it requires several highly skilled persons and a considerable amount of time to accurately position the member. In addition, even though the workpiece may be accurately positioned at the conclusion of each observation, immediately thereafter there is no assurance it is still positioned within the required tolerance as there will normally be no readily apparent indication of the movement of the workpiece.

It is now proposed to provide means for positioning a workpiece which will overcome the foregoing difficulties. More particularly, it is proposed to provide means which will automatically sense any displacement of a workpiece from a predetermined position and will automatically reposition the member so as to maintain it accurately positioned. More particularly, this is to be accomplished by providing a reflective target on the workpiece together with means for projecting a light pattern onto the target reflector and means for sensing any displacement of the reflected light pattern. In addition, means may be provided that will reposition the workpiece such that the displacement of the reflected light pattern and, therefore, the displacement of the workpiece will be reduced to less than a predetermined minimum.

These and other features and advantages of the present invention will become readily apparent from the following specification and drawings wherein like reference numerals refer to like parts and wherein:

FIGURE 1 is a side view of a positioning system embodying one form of the present invention;

FIGURE 2 is an isometric view, with portions thereof broken away, of a projection means employed in the system of FIGURE 1;

Figure 3:
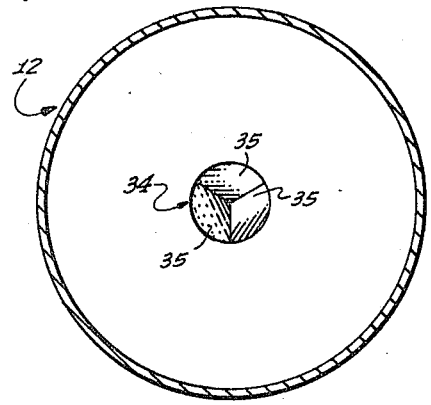
FIGURE 3 is an end view, taken substantially from the plane line 3—3 in FIGURE 1 and looking in the direction of the arrows thereon, of a portion of the end of the workpiece of FIGURE 1.

Referring to the drawings in more detail, and particularly to FIGURE 1 thereof, the present invention is embodied in a positioning system particularly adapted for maintaining an enlarged workpiece 12 precisely supported in a predetermined fixed position. The workpiece 12 may be of any desired variety. For example, it may be a space vehicle, a structural member in a bridge or building, a section of pipe to be interconnected with a pipeline or a workpiece upon which it is desired to secure additional members. In the present instance for purposes of illustration, the workpiece 12 is shown as being positioned inside of a pair of tooling rings 14 and 16. Each of the tooling rings 14 and 16 is in turn located on pairs of adjustable jacks 18 and 20 that can travel on tracks 22 and 24 projecting upwardly from a floor or similar support.

The present workpiece 12 is an enlarged structure upon which it is desired to mount additional parts that must be very precisely positioned. In order to insure that the parts are accurately positioned, they are positioned by means of one or more transits or theodolites 26 which are mounted on a track 27 extending along a fixed stand 28. Each of the transits or theodolites 26 will thus have a position which is accurately known. In order to insure the accuracy of the positioning by this means, it is, of course, necessary for the workpiece 12 to be accurately positioned with respect to the stand 28.

Each of the jacks 18 and 20 includes a motor (not shown) which may be driven to adjust the overall length of the jack. The motors may be of any desired variety such as a hydraulic cylinder and piston or an electric motor and screw. It will thus be seen that, by energizing one or more of the jack motors, either of the tooling rings 14 or 16 may be raised or lowered to thereby raise or lower either end of the workpiece 12 and align it vertically. In addition, means may be provided for causing either pair of jacks 18 and 20 to travel along the tracks 22 and 24 for aligning the tooling rings 14 and 16 in the horizontal direction.

The positioning system includes one or more projectors 30, one for each end of the workpiece 12, in the present instance. Each projector 30 is effective for directing a beam 32 of light along the main optical axis of the projector and onto a reflective target 34 mounted on the workpiece 12 for returning a beam 36 of light back to the projector 30. The projector 30 which is adapted to be mounted on the stand 28 adjacent to the transit 26 includes an elongated cylindrical barrel 38 having a light source such as an incandescent lamp 40 mounted adjacent one end thereof. A reflector 42 and condensing lens 44 may be positioned adjacent to the lamp 40 for forming the light therefrom into a beam of focused light.

A shutter 46 may be disposed adjacent to the condensing lens 44 and in substantial alignment with the focused beam so as to form the beam into a predetermined pattern.

The shutter 46 comprises an opaque disc 47 that has an opening therein that corresponds to the pattern that it is desired to be employed. Although a wide variety of patterns may be employed, in the present instance the pattern consists of a dark background with a radially extending slit 52. The shutter pattern rotates about its center which is substantially coincident with one end of the slit 52 and the main optical axis of the instrument. Accordingly, the present shutter 46 includes an opaque portion 47 with a radial slit 52 of relatively narrow width that has the inner end thereof disposed on the longitudinal axis of the barrel 38. In order to cause the disc 47 to rotate, a substantially constant speed motor 54 may be connected thereto by means of a speed-reducing gear train 55 so that the shutter 46 will revolve on the order of one revolution per second. In addition, an encoder 56 may be connected to the gear train 55 so as to provide a code signal of the angular position of the shutter 46. Encoders that provide the required outputs are within the present state-of-the-art and are capable of affording the degree of accuracy required on any specific application.

A pair of lenses 58 and 60 may be positioned in the barrel 38 so as to project a uniformly illuminated image of the light pattern from the shutter toward the reflective target 34.

The target reflector 34 which may be of any suitable variety is preferably adapted to reflect light back in a beam 36 that is substantially parallel to the original beam 32 that is incident thereon but is laterally displaced from the original beam 32 by an amount that is a function of the amount that the axis of the reflector 34 is displaced from the original beam 32. For example, the reflector 34 may comprise a trihedral prism having three reflective surfaces 35 that are all orthogonal to each other. Such a reflector will always reflect the light back in a direction parallel to the original beam irrespective of the angular orientation of the reflector with respect to direction of the original beam. It will thus be seen that any displacement of the reflected beam 36 will be a function of the lateral displacement of the workpiece and will be independent of the angular displacement or skewness of the workpiece 12.

A different reflector, such as a plane—or a concave mirror may be employed, if an angular—rather than a lateral displacement is to be sensed. Different reflectors may be used in combination to sense both lateral and angular displacements simultaneously.

The beam 36 of light which is reflected back from the target will normally be returning along a line that is substantially coincident with or very close to the original beam 32. As a result, the reflected beam 36 will be incident upon the two lenses 58 and 60 so as to pass therethrough. These lenses 58 and 60 will form the pattern in the reflected beam 36 into a sharp image or spoke 48 in the image plane of the lenses. In order to determine the characteristics and/or displacement of this image, a sensor unit 62 may be disposed in this plane. Since this plane will be substantially coincident with the shutter 46, it has been found desirable to place the sensor unit 62 in the end of an arm 64 that projects laterally from the side of the barrel 38. A beam splitter 66 such as a partially reflective mirror may be disposed in the barrel so as to direct a portion of the reflected beam 36 onto the sensor unit 62.

Although the sensor unit 62 may be of any suitable variety, it is particularly adapted to sense the light pattern as it is directed thereon. In the present instance the unit 62 includes a plurality of photoelectric cells 72, 74, 76 and 78 that will be effective to produce an electrical output signal that is a function of the intensity of light that is incident thereon. Sensor unit 62 is circular and the four photoelectric cells are arranged in a cruciform pattern about the center of the sensor unit. The cells are each positioned 90° apart and an equal distance from the center of the sensor unit. The sensor unit is positioned such that its center coincides with a second optical axis (indicated by line 32') of the projector. This second optical axis is normal to the main optical axis of the projector which coincides with line 32 indicating the projected light beam.

Although it is possible for an operator to manually adjust the jacks 18 and 20 so as to insure all the pulses from the photocells 72, 74, 76 and 78 being equally spaced, it is desirable for means to be provided that will automatically and continuously maintain the workpiece 12 in position. Accordingly, each of the photocells 72, 74, 76 and 78 may be connected to pulse shapers 82, 84, 86 and 88 leading to four inputs to a computer 90. The pulse shapers 82–88 may be overdriven amplifiers or similar structures that will cause the leading edges of the pulses to be more nearly vertical. By making the rise time of the pulse very short, a higher degree of accuracy may be obtained in timing the pulses. In addition the pulse shapers 82–88 may be connected to a logic OR gate 100 that is in turn interconnected with the encoder 56. The encoder 56 in turn has the output interconnected with the computer 90.

The computer 90 will be effective to compare the angular positions marked by the pulses from the photocells 72, 74, 76 and 78 to provide signals on the outputs 92, 94, 96 and 98 that will be proportional to the amount and direction of displacement. These outputs may be connected to the jacks 18 and 20 to move the workpiece 12 back into position. In addition, they may be connected to recording means for making a record of the time and amount of repositioning that was made.

In order to employ the present invention for maintaining the workpiece 12 properly centered in a predetermined position, the first step is to mount the reflective target 34 on one or both ends of the workpiece 12. This target 34, which is a trihedral prism, is mounted so that the axis is precisely located in a predetermined fixed position with respect to the workpiece 12. The workpiece 12 may then be seated in the tooling rings 14 and 16 so that the desired operations may be performed thereon. Once the workpiece 12 is properly seated in the tooling rings 14 and 16, the jacks 18 and 20 may be manually adjusted, if necessary, both vertically and horizontally, so that the workpiece 12 is approximately located in the desired position. The lamps 40 in the projectors 30 may then be turned on so that the beam 32 of light will be projected therefrom and directed toward the reflecting targets 34. If the workpiece 12 has been placed in approximate position, these beams 32 of light will be incident upon the reflective targets 34 so as to be reflected back to the projectors 30 so that at least a portion of the pattern in the beam will be focused onto the sensor unit 62.

Normally the reflective targets 34 will initially be displaced somewhat from the desired position. As a result, the beam 32 of light will not be coincident with the axis of the reflector. As a consequence, the reflected beam 36 of light will be returned upon a path that is parallel to the incident light but is laterally displaced therefrom in the direction of misalignment and by an amount that is a function thereof. The displacement of the beam 36 will be independent of the angular alignment of the reflector 34 and will be solely dependent upon the lateral position thereof. The reflected beam 36 will be incident upon the lenses 58 and 60 and so will be focused onto the sensor unit 62.

Figure 4:
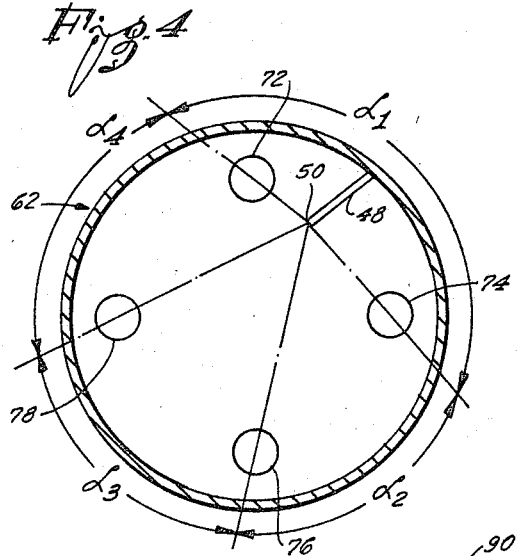
FIGURE 4 is a cross-sectional view, on an enlarged scale and taken substantially in the plane of line 4—4 of FIGURE 2 and looking in the direction of the arrows, of an optical sensor employed in the projector means of FIGURE 2.
Figure 5:
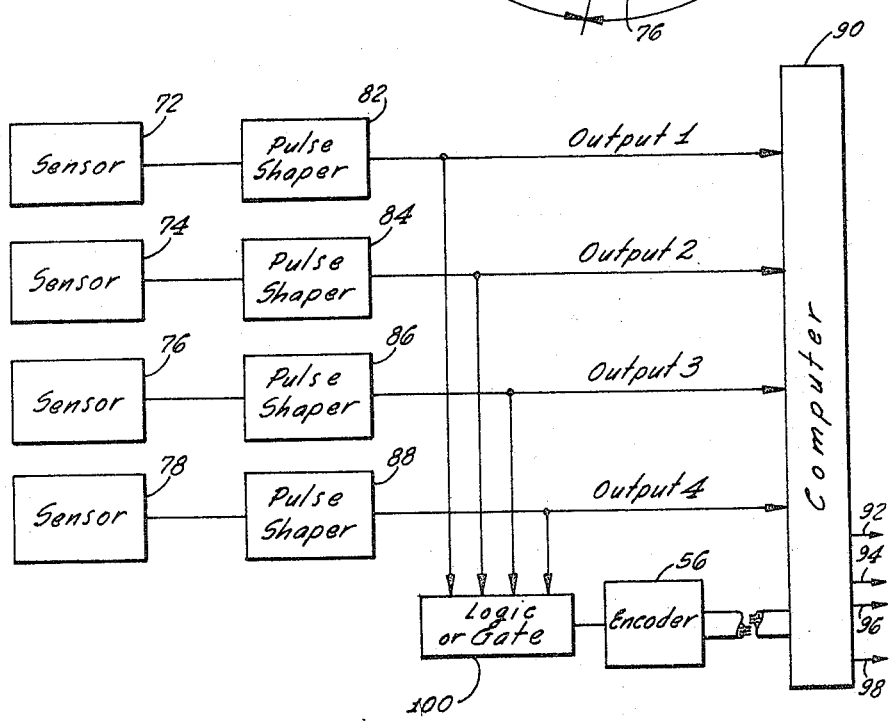
FIGURE 5 is a block diagram of means for controlling the repositioning operation of the system of FIGURE 1.

In the event the projected beam 32 has a pattern that comprises a radial spoke of light rotating about the main optical axis of the projector it is obvious that the reflected beam 36 will have a like pattern. The reflected pattern will have an axis of rotation that coincides with the main optical axis of the projector when the workpiece is in alignment. However, if the workpiece is out of alignment, the axis of rotation of reflected beam 36 will be displaced from the optical axis by an amount dependent upon the degree of misalignment. The reflected rotating pattern is deflected at a right angle by beam splitter 66 so that a rotating spoke of light 48 falls upon the face of sensor unit 62. Spoke 48 will, depending upon the alignment of the workpiece, either rotate about optical axis 32' or displaced axis 36'. If the deflected pattern is displaced from optical axis 32' then spoke 48 will rotate about end 50 thereof. As this spoke 48 sweeps across one or more of the photocells 72 to 78, the photocells will generate pulses. The time of the beginning of the pulses will correspond to the time the leading edge of the light in the spoke passes over the photocell. If the axis of rotation coincides with optical axis 32', the pulses will all occur at equal time intervals. However, if the axis of the rotation is displaced as shown in FIGURE 4, the spoke image will sweep across the photocells at unequal angular intervals and the encoder pulses will indicate unequal angles. More particularly, the angle indicated between photocells 72 and 74 will be $\alpha 1$, the angle indicated between photocells 74 and 76 will be $\alpha 2$, the angle indicated between photocells 76 and 78 will be $\alpha 3$, and the angle indicated between photocells 78 and 72 will be $\alpha 4$.

The output pulses from the photocells will then be fed into the various inputs to the pulse shapers 82, 84, 86 and 88. The shapers will shape the pulses to provide a sharp triggering pulse for interrogating the encoder 54 and gate the computer 90. By this means the computer may determine the amount and direction of displacement of the workpiece 12 to provide output signals on the outputs 92, 94, 96 and 98 indicative thereof. These signals on the outputs 92, 94, 96 and 98 will then actuate the jacks 18 and 20 so as to move the tooling rings 14 and 16 into a position such that all of the pulses will be equally spaced. At this time the reflective target 34 will have the axis in the exact location desired. In the event that the workpiece 12 should move laterally out of position as a result of thermal effects, etc., the movement will cause a corresponding displacement of the pattern and the computer 90 will then immediately actuate the jacks 18 and 20 so as to exactly return the workpiece to its desired location.

Although only a single embodiment of the present invention has been disclosed, it will be readily apparent to those skilled in the art that numerous changes and modifications may be made thereto without departing from the spirit of the invention. Accordingly, the foregoing descriptions and drawings are for illustrative purposes only and do not in any way limit the invention which is defined only by the claims which follow.

What is claimed is:

1. An alignment apparatus for continuously maintaining a workpiece in a precise predetermined position comprising, in combination:
   (a) electro-optical means for determining the position of said workpiece and generating electric signals that indicate the position thereof;
   (b) computer means electrically connected to said optical means for receiving the electric signals from said optical means and generating an error signal when the workpiece is out of position;
   (c) movable support means on which said workpiece is mounted that are electrically connected to said computer and actuated by the error signal therefrom to reposition the workpiece;
   (d) said electro-optical means including:
      (1) instrument means for projecting toward the workpiece a light beam pattern having the form of a radial sector of light that rotates about a first optical axis of the instrument means,
      (2) means mounted on said workpiece for reflecting the light beam pattern back to said instrument with the radial sector of light rotating about a first axis of rotation that normally coincides with the first optical axis, said first axis of rotation coinciding with the first optical axis when said workpiece is in alignment, but being displaced therefrom when said workpiece is out of alignment,
      (3) beam splitter means mounted in said instrument for deflecting said reflected light beam pattern along a second axis of rotation normal to the first axis of rotation of said reflected light beam pattern.
      (4) a plurality of photoelectric means mounted in said instrument and positioned in a circular array whose center coincides with a second optical axis normal to the first optical axis of said instrument means; said second axis of rotation coinciding with the second optical axis when the workpiece is in alignment but displaced therefrom when the workpiece is out of alignment; whereby said photoelectric means will generate a series of electric signals whose time sequence indicates the relative positions of the optical axis of rotation.

2. Electro-optical alignment apparatus for maintaining the alignment of a workpiece comprising:
   (a) instrument means for projecting a beam of light;
   (b) rotating shutter means mounted in said instrument means for forming said beam of light into a pattern in the form of radial sector of light which rotates about a main optical axis of said instrument means;
   (c) reflector means mounted on said workpiece that reflects the projected pattern back to said instrument means along an axis of rotation that coincides with the main optical axis when the workpiece is in alignment but is displaced therefrom when said workpiece is out of alignment;
   (d) a circular array of photoelectric cells mounted in said instrument means, said cells being equally spaced about a center coincident with a second optical axis normal to the main optical axis;
   (e) beam splitter means mounted in said instrument means for deflecting said reflected light beam pattern onto said array of cells along an axis of rotation that is coincident with the second optical axis when the workpiece is in alignment;
   (f) circuit means connected to said array of cells for generating an electric pulse each time one of said cells is illuminated by the deflected light beam pattern;
   (g) encoder means connected to said rotating shutter means and interrogated by the electric pulse from said circuit means for providing an electric signal indicative of the instantaneous angular position of the radial sector of reflected light formed by said shutter means;
   (h) computer means connected to said circuit means and said encoder means to receive the electric signals therefrom and provide an error signal in response thereto that is indicative of the amount of displacement between the optical axis and the axis of rotation of the reflected light beam pattern; and
   (i) positioning means actuated by said error signal for correcting any misalignment of said workpiece.

3. The apparatus recited in claim 2 wherein said shutter means includes:
   (a) an opaque disc mounted for rotation about its center and positioned such that its center coincides with the main optical axis of said instrument means,
   (b) said disc having a radial slit formed therein which extends from the center of said disc to the outer periphery thereof.

4. An alignment system for maintaining the position of a large cylindrical body, said system comprising:
   (a) an optical means for continuously monitoring the position of the body and generating electric signals that indicate the position thereof;
   (b) computer means electrically connected to said optical means for receiving signals from said optical means and generating error signals in response thereto;
   (c) adjustable support means supporting said body that are actuated by the error signals from said computer means to maintain the position of said body;
   (d) said optical means including:
      (1) an optical instrument positioned adjacent said body,
      (2) a light source mounted in said instrument for projecting a beam of light toward said body,
      (3) an opaque disc having a radial slit formed therein, said disc being mounted for rotation about its center and positioned between said light source and said body; whereby, during operation of said instrument a light beam is generated having a pattern in the form of a sector of light rotating about an axis that coincides with the center of said disc and a first optical axis of said instrument,
(4) lens means mounted in said instrument and positioned between said disc and said body for forming a sharp image of the sector of light formed by said disc,
(5) reflecting means mounted on said body for reflecting the projected light beam pattern back toward said optical instrument, said reflected light beam pattern rotating about a first axis of rotation which coincides with said first optical axis when said body is properly positioned, but is displaced therefrom when said body is out of position,
(6) beam splitter means mounted in said instrument between said disc and said lens means for deflecting the reflected light beam pattern along a second axis of rotation normal to the first axis of rotation,
(7) a circular array of evenly spaced photoelectric cells mounted in said instrument and positioned such that the center of the array coincides with a second optical axis; said second optical axis coinciding with said second axis of rotation when the body is properly positioned, whereby the deflected light beam pattern will illuminate the photoelectric cells at equal time intervals when the body is properly positioned but at unequal time intervals when the body is out of position, said photoelectric cells each generating an electric signal when illuminated,
(8) encoder means coupled to said rotatable disc and interrogated by signals from said photoelectric cells for providing an electric signal indicative of the instantaneous angular position of the reflected image of the slit formed in said disc, the signals from said photoelectric cells and said encoder being fed to said computer means which in turn generates the error signal to actuate said adjustable support means when repositioning of the body is indicated.

References Cited

UNITED STATES PATENTS

| | | | |
|---|---|---|---|
| 2,703,505 | 3/1955 | Senn | 88—14 |
| 2,713,134 | 7/1955 | Eckweiler. | |
| 2,870,671 | 1/1959 | Falconi | 88—14 |
| 2,950,428 | 8/1960 | Gievers. | |
| 3,024,365 | 3/1962 | Smith et al. | |
| 3,031,919 | 5/1962 | Collyer | 88—14 |
| 3,072,798 | 1/1963 | Sick | 88—14 X |

OTHER REFERENCES

K & E, Precision Visual and Electronic Auto-Collimators, September 1961, Keuffel & Esser Co., Hoboken, N.J.; page 3 only.

JEWELL H. PEDERSEN, *Primary Examiner.*

T. L. HUDSON, W. A. SKLAR, *Assistant Examiners.*